(12) United States Patent
Nakamura et al.

(10) Patent No.: US 6,417,592 B2
(45) Date of Patent: Jul. 9, 2002

(54) ROTARY ELECTRIC MACHINE FOR VEHICLE

(75) Inventors: Shigenobu Nakamura, Anjo; Atsushi Umeda, Okazaki, both of (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 09/731,859

(22) Filed: Dec. 8, 2000

(30) Foreign Application Priority Data

Dec. 9, 1999 (JP) ............................................ 11-350074

(51) Int. Cl.[7] .................................................. H02K 3/00
(52) U.S. Cl. ........................................ 310/184; 310/198
(58) Field of Search ................................. 310/201, 184, 310/198

(56) References Cited

U.S. PATENT DOCUMENTS

| | | | |
|---|---|---|---|
| 3,949,254 A | 4/1976 | Woll et al. .................. 310/198 |
| 4,351,102 A | 9/1982 | Grozinger et al. ............. 29/596 |
| 4,402,129 A | * 9/1983 | Kreuzer et al. ................ 29/596 |
| 5,449,962 A | * 9/1995 | Shichijyo et al. ............ 310/180 |
| 5,691,590 A | * 11/1997 | Kawai et al. ................ 310/180 |
| 5,708,316 A | * 1/1998 | Ishida ........................ 310/180 |
| 5,998,903 A | 12/1999 | Umeda et al. ............... 310/179 |

FOREIGN PATENT DOCUMENTS

| | | | |
|---|---|---|---|
| CH | 580 349 | 9/1976 | |
| DE | 3901098 C1 | * 4/1990 | ............ H02K/3/28 |
| EP | 0 986 160 | 3/2000 | |
| JP | 06-165422 A | * 6/1994 | |
| JP | 07-303351 A | * 11/1995 | |
| JP | 08-205441 A | * 8/1996 | |
| WO | WO 9206527 A1 | * 4/1992 | ............ H02K/3/12 |
| WO | WO 9854823 A1 | * 12/1998 | ............ H02K/1/00 |

* cited by examiner

Primary Examiner—Joseph Waks
(74) Attorney, Agent, or Firm—Oliff & Berridge, PLC

(57) ABSTRACT

In a vehicle rotary electric machine, a stator core has a plurality of slots accommodating a plurality of conductors forming a plurality of phase windings. The phase winding includes a plurality of parallel-connected winding sections. Each of the winding sections is formed of a plurality of series-connected conductors that is distributed to the plurality of slots neighbor to each other.

11 Claims, 9 Drawing Sheets

ROTARY ELECTRIC MACHINE FOR VEHICLE

CROSS REFERENCE TO RELATED APPLICATION

The present application is based on and claims priority from Japanese Patent Application Hei 11-350074 filed Dec. 9, 1999, the contents of which are incorporated herein by reference.

BACKGROUND OF THE INVENTION

1. Field of the Invention

The present invention relates to a rotary electric machine such as a motor or a generator to be mounted in a ship or a vehicle.

2. Description of the Related Art

Recently, hybrid vehicles have been manufactured in order to protect the environment. A hybrid vehicle is driven by a motor while running at a low speed in a town or the like and is driven by an engine while running at a high speed in a suburb. There is a hybrid vehicle, such as a hybrid bus on a regular route, whose engine is switched off when the vehicle stops temporarily on a traffic signal. Such a hybrid bus is equipped with an idle-stop system for automatically stopping the engine. Incidentally, an inexpensive rotary electric machine that operates both as a motor and as a generator has been demanded to continuously drive a compressor and/or a power steering pump while the vehicle engine is stopped.

WO98/54823 or U.S. Pat. No. 5,998,903, which corresponds to WO98/54823, discloses a compact and powerful generator. Such a generator has a stator winding formed of a plurality of conductor segments, a stator core having two times as many slots as an ordinary generator. The conductor segments are connected so that one of the conductor segments that extended from one of a plurality of layers of a slot is connected to another that are extended from another layer of another slot. This arrangement improves the conductor's space-factor and cooling effect of the stator winding, resulting in a stator winding of low resistance. In the above publication, there is an embodiment, in which windings that are disposed in the neighboring slots are connected in series to be connected to a rectifier bridge to provide a DC output power. There is another embodiment, in which windings disposed in the neighboring slots are connected in parallel to be connected to respective rectifier bridges to provide a composite DC output power.

In a vehicle rotary electric machine, there is a demand for increasing current capacity of each phase winding. For example, if the torque of a motor is increased, it is necessary to increase drive current supplied to the stator winding. It is also necessary to lower the resistance of phase windings of a generator to generate a large amount of current.

SUMMARY OF THE INVENTION

In view of the above subject, a main object of the invention is to provide a vehicle rotary electric machine that has a stator winding having a large current capacity.

Another object of the invention is to accommodate a small number of conductors in each slot and form a plurality winding sections connected in parallel, thereby increasing the current capacity of the stator winding.

Another object of the invention is to provide new conductor segments that are suitable for forming a parallel circuit of the winding sections.

Another object of the invention is to provide a vehicle rotary electric machine that can operate as both a motor and a generator.

According to a feature of the invention, a phase-winding is formed of a plurality of parallel winding sections, each of which is comprised of a plurality of conductors. This plurality of conductors is distributed to a plurality of neighboring slots.

As a result, the rotary electric machine can provide a sufficient torque characteristic, as a motor, and a sufficient output current characteristic, as a generator.

It is possible to provide five-phase or six-phase stator winding. However, parts of rectifying bridges or an inverter circuit should not be increased too many. From this point of view, three-phase stator winding is the most suitable. It is also possible to increase the number of the slots accommodating a plurality of the conductors forming a phase winding to more than two. However, it is necessary to take the size of the vehicle rotary electric machine into account, and two slots are the most suitable from this point of view. It is possible to increase the number of parallel winding sections to more than two. However, the working time for connecting such winding sections in parallel should be considered. From this point of view, two winding sections in parallel are the most suitable. Further, the number of conductors accommodated in each slot can be increased to more than two. However, current capacity, size, productivity of the rotary electric machine should be taken into account. For example, four conductors or less in each slot is the best suitable for a motor.

It is possible to provide a structure in which the winding sections are the same in phase with one another at opposite ends to be connected in parallel.

In general, if a winding formed of a plurality of series connected conductors disposed in a slot and another winding formed of a plurality of series connected conductors disposed in the next or neighboring slot are connected in parallel, current may flow from one to another because of phase difference between two winding. As a result, the efficiency of the rotary electric machine is not sufficiently high. However, the rotary electric machine according to the invention eliminates the phase difference, so that a sufficiently high efficiency can be maintained.

Further, a phase winding is formed of a first winding section and a second winding section. The first winding section includes a series circuit of a portion of a plurality of conductors disposed in one of the two neighboring slots and a portion of a plurality of conductors disposed in the other slot. The second winding section includes a series circuit of the remaining portion of the plurality of conductors disposed in the one slot and the remaining portion of the conductors disposed the other slot.

The first winding section may include a series circuit of a half of a plurality of conductors disposed in one of the two neighboring slots and a half of a plurality of conductors disposed in the other slot.

The conductors of the first winding section and the conductors; of the second winding section are connected in a manner corresponding to the phase angle, forming a diamond shape, which equalizes the phase angle of the first and second winding sections.

If the number of poles of said rotor is p, the number of phases of said multi-phase stator winding is n, the number of the neighboring slots for accommodating conductors of the phase winding of the stator winding is m, the total number of the slot is equal to or more than p×n×m.

The above structure is important to the vehicle rotary electric machine. For example, a 16-pole, three-phase and two-neighboring-slot type rotary electric machine has 96 slots. This type can provide a suitable size of a vehicle rotary electric machine. If a rotary electric machine has some empty slots, the number of slots becomes more than 96.

The above embodiment may include switch elements connected to the respective phase windings of the multi-phase stator winding. The number of the switch elements that are connected to respective phase windings is proportional to the number of the phases because each phase winding is formed of the winding sections connected to each other in parallel. For example, three-phase stator winding is connected to a three-phase bridge circuit. This structure can make the number and the size of the switching elements small. It is desirable to use diodes as the switching elements. A rectifier can be formed of diodes, and an inverter can be formed of transistors or MOS transistors.

The conductor may be a conductor segment connected at a coil end that is extended to an end of the stator core. The conductor segment is suitable to a stator having a small number of conductors in each slot. The conductors that are distributed to neighboring slots are connected in series to form a winding section, thereby providing a suitable number of coil-turns.

In addition, a plurality of coil ends is extended to an end of the stator core and is spaced apart from one another.

It is easy to line up the coil ends at a prescribed portion so that the coil ends can be spaced apart from each other. This arrangement is effective to lessen heat problems. It is also effective to provide an even arrangement of the coil ends. For example, it is possible to provide gaps for passing cooling air between the coil ends.

It is also possible to fill the gaps with resinous material. Preferably, the conductors disposed in the slots have a rectangular cross-section having longer radial sides.

The vehicle rotary electric machine can be provided with a booster for boosting output voltage generated by the stator winding in a low speed range. Further, a switching device can disposed. in the rotary electric machine to repeat grounding and opening of the output terminal of the stator winding.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Rotary electric machines according to a first embodiment of the invention is described with reference to FIGS. 1–8.

Figure 1:
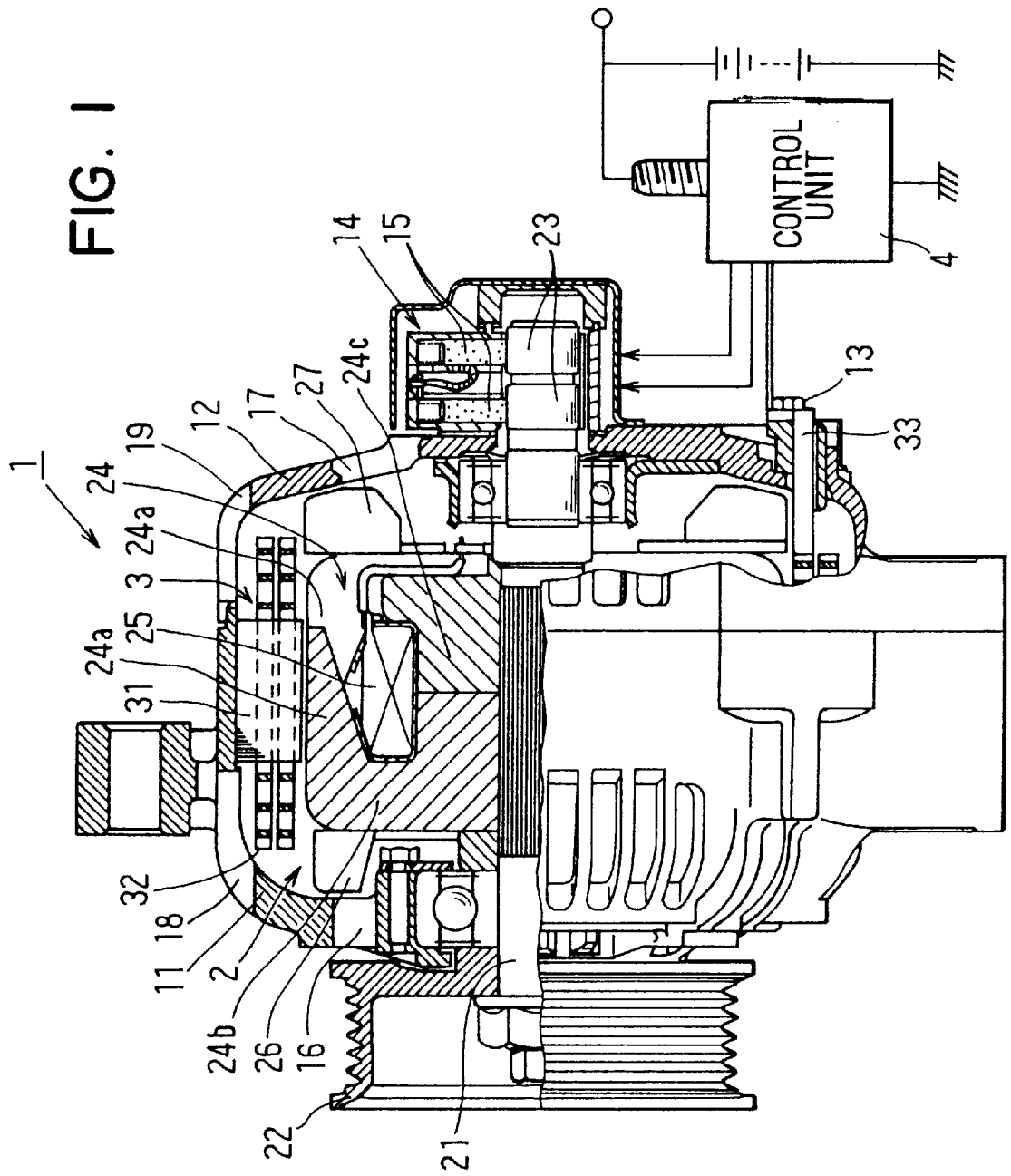
FIG. 1 is a cross-sectional view illustrating the whole structure of a rotary electric machine according to a first embodiment of the invention.

As shown in FIG. 1, vehicle generator-motor 1 as a vehicle rotary electric machine includes front frame 11 and rear frame 12. Front frame 11 and rear frame 12 rotatably support rotor 2 and also fixedly support stator 3. Rear frame 12 has output terminal 13.

Shaft 21 of rotor 2 extends through front frame 11 and projects from frame 11 to have pulley 22 fixed at the left of front end thereof. Pulley 22 is linked to a vehicle drive engine via a belt (not shown). The right or rear end of shaft 21 projects backward from rear frame 12 to a portion where brush unit 14 is disposed. Brush unit 14 has a pair of brushes 15 disposed in contact with a pair of slip rings 23 that is carried by shaft 21. Shaft 21 carries Lundell-type magnetic core 24. Magnetic core 24 has a plurality of pole pieces 24a on the outer periphery thereof. Magnetic core 24 is comprised of front pole core 24b and rear pole core 24c. Magnetic field coil 25 is disposed between both pole cores 24b and 24c to polarize the plurality of pole pieces 24a. Field coil 25 is connected to the pair of slip rings 23 to be energized via brush unit 14. Magnetic core 23 has front fan 26 and rear fan 27, which are respectively fixed on the opposite ends thereof. Front and rear fans 26 and 27 take air from air-intake windows 16 and 17 formed at frames 11 and 12 and discharge the air from air discharge windows 18 and 19.

Stator 3 is disposed opposite the plurality of pole pieces 24a of rotor 2. Stator 3 is a cylindrical member disposed around rotor 2. Stator 3 has stator core 31 that is formed of a plurality of laminated steel sheets and stator winding 32 mounted on stator core 31. One end of stator winding 32 is connected to output terminal 13 as output lead wire 33.

Figure 2:
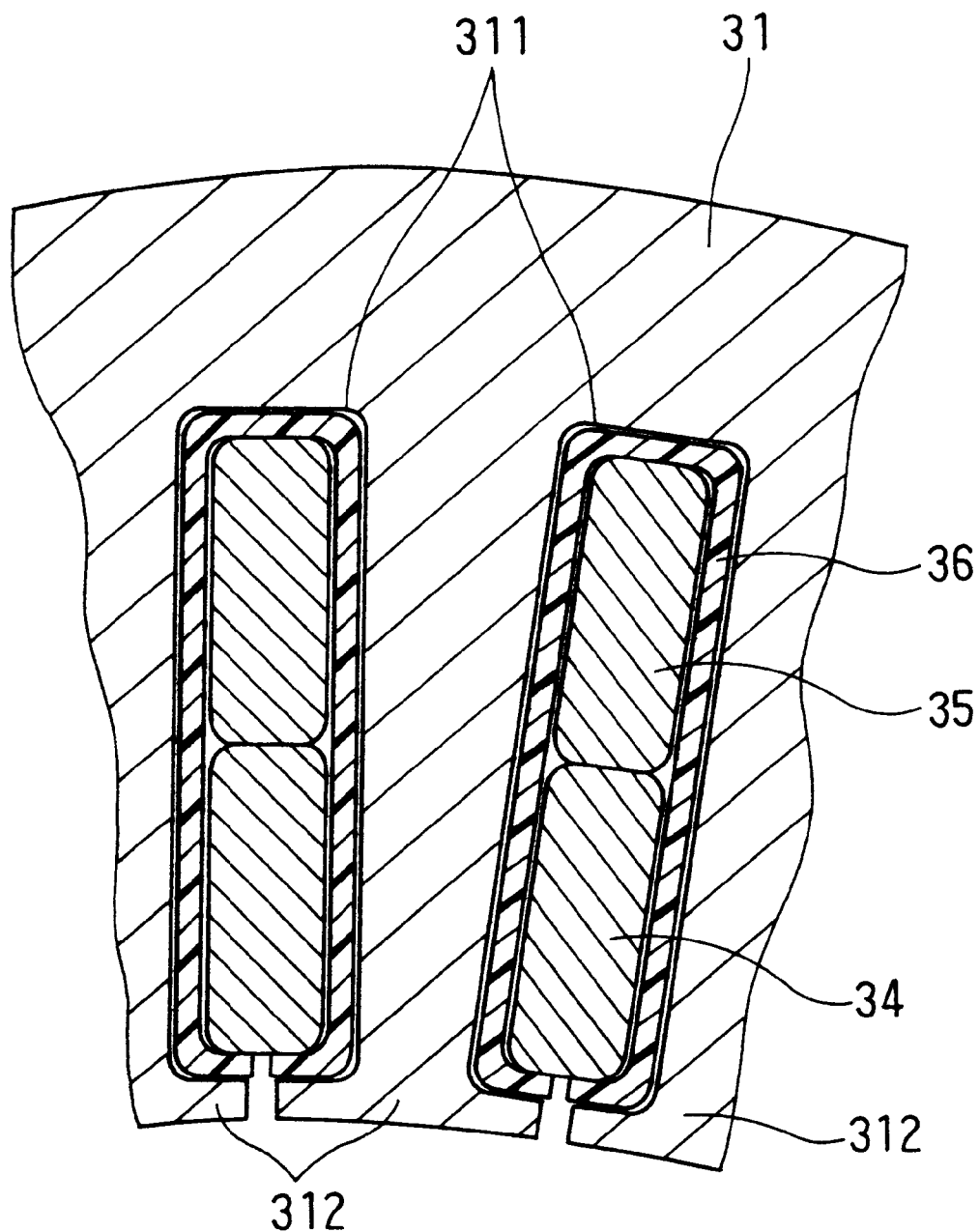
FIG. 2 is a fragmentary cross-sectional view of a stator according to the first embodiment.

As shown in FIG. 2, stator core 31 has a plurality of axially extending slots 310. The plurality of slots 310 is formed to open at the inner periphery of stator core 31 opposite pole pieces 24a, where teeth 312 are also formed. There are 96 slots in this embodiment. Two conductors are disposed in each slot 311. Conductor 34 disposed in a radially inner layer and conductor 35 disposed in a radially outer layer are radially piled or stratified in each slot. Conductors 34 and 35 have a rectangular cross-section whose radial sides are longer than the circumferential sides so that wider teeth can be provided. The wide teeth provide excellent heat conduction from conductors to the stator and a suitable distance between respective coil ends outside the slots. Insulators 36 of a thin insulation sheet are respectively disposed between conductors 34, 35 and the inner surfaces of slots 311.

Figure 3:
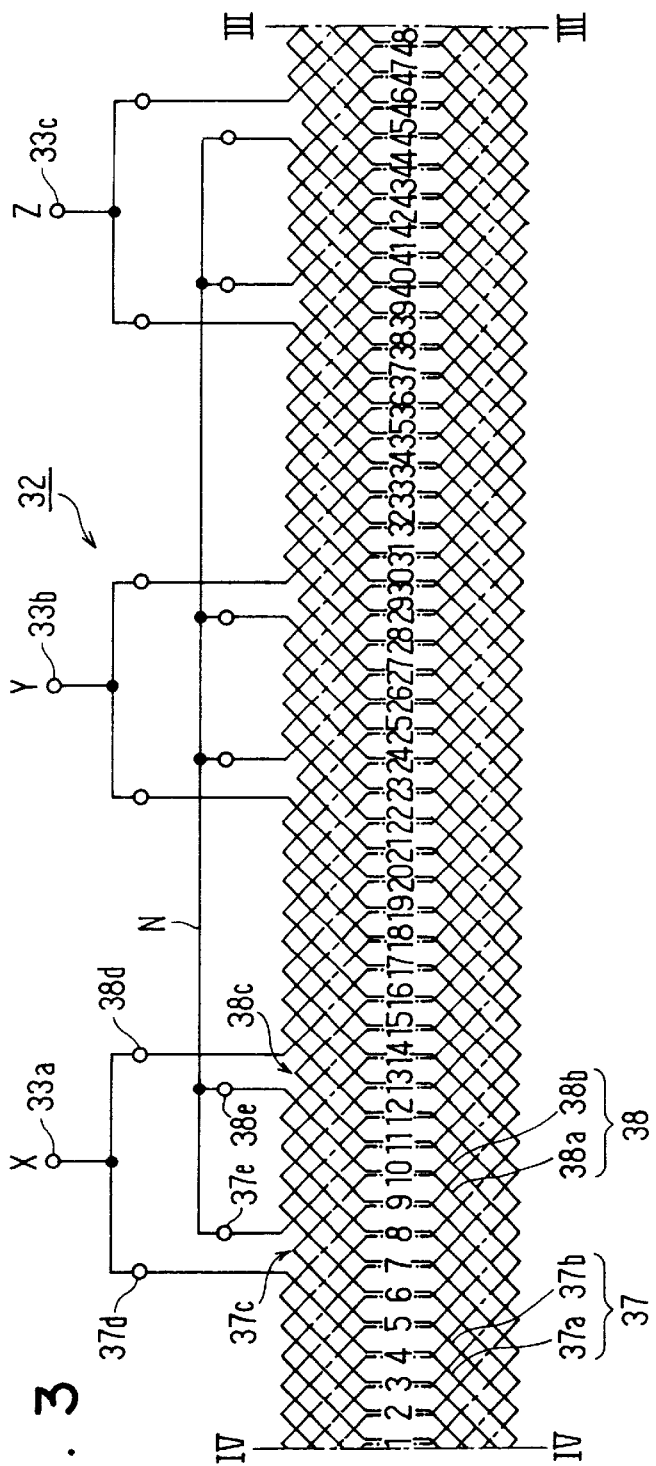
FIG. 3 is a circuit diagram of a stator winding according to the first embodiment.
Figure 4:
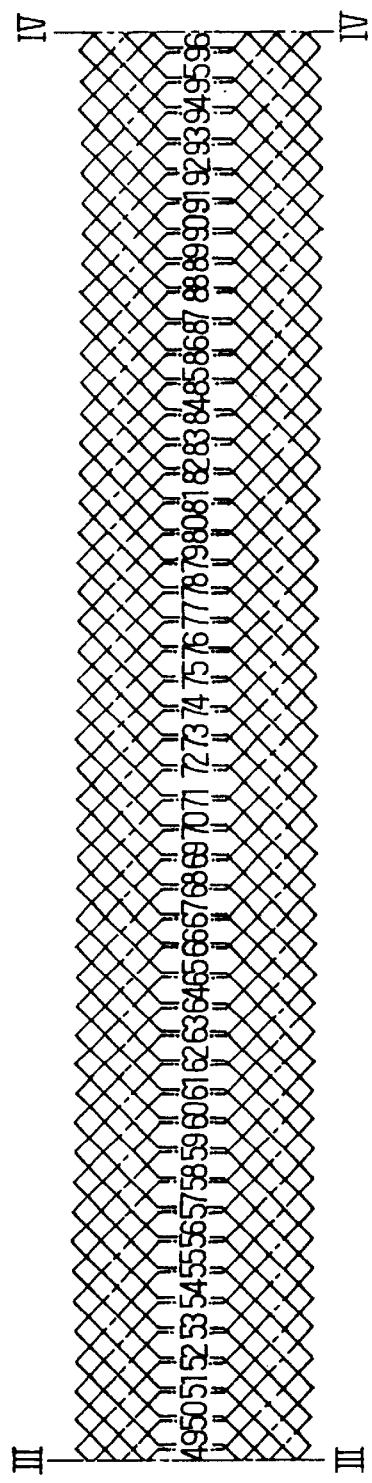
FIG. 4 is a winding diagram of the stator winding according to the first embodiment that is connected to the portions illustrated in FIG. 3 at line III—III and line IV—IV.

Stator winding 32 is formed of conductors 34 and 35 respectively disposed in the inner and outer layers of a plurality of slots 311. As shown in FIGS. 3 and 4, the plurality of slots 311 forms six groups that are different in electric phase from one another. For example, the first slot group includes slots #4, #10, #16–#88 and #94 (slot numbers indicated in the middle of the winding diagrams), the second slot group includes #5, #11, #17–#89 and #95, as shown in FIGS. 3 and 4. The third, fourth, fifth and sixth slot groups are disposed in the stator core in the same manner. The first and second slot groups are disposed neighbor to each other and accommodate an X-phase winding. The third and fourth slot groups are disposed next or neighbor to each other and accommodate a Y-phase winding, and the fifth and sixth slot groups are disposed neighbor to each other and accommodate a Z-phase winding.

Basically, conductors 34 and 35 are alternately connected in series. In other words, one of conductors 34 and 35 accommodated in a slot is series-connected to the other of conductors 34 and 35 accommodated in another slot that is six-slot-pitch spaced apart from the aforestated slot. Thus, twelve wave-wound winding units that round stator core 32 are formed. Two conductors accommodated in a slot are respectively connected to other conductors to form two wave-wound winding units. In other words, the first slot group accommodates two wave-wound winding units 37a and 38a.

Two winding units 37a and 37b, which are accommodated in the neighboring first and second slot groups, are connected in series by crossing wire 37c to form winding section 37. Accordingly, a plurality of conductors of winding section 37 is distributed to two neighboring slot groups. Opposite ends 37d and 37e of winding section 37 are extended in the axial direction from coil ends. Remaining two winding units 38a and 38b of all the four wave-wound winding units accommodated in the first and second slot groups are series-connected by crossing wire 38c to form winding section 38. Opposite ends 38d and 38e of winding section 38 are extended in the axial direction from coil ends. Ends 37d and 38d are connected to each other and to X-phase output terminal 33a. On the other hand, end 37e and end 38e are connected to each other to form a neutral point N. As a result, two winding sections 36 and 37 accommodated in the two neighboring slot groups are connected in parallel. Thus, the X-phase winding having two conductors each slot is formed. Y-phase winding and Z-phase winding are also formed in the same manner as described above.

Figure 5:
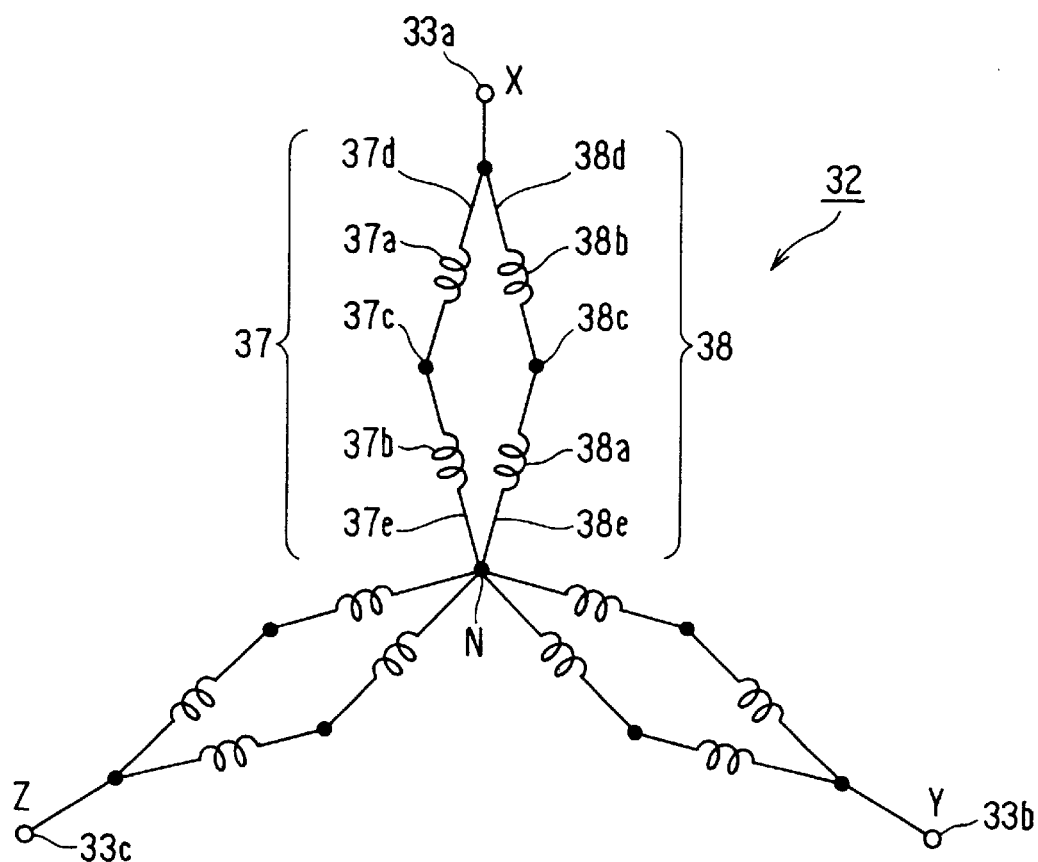
FIG. 5 is a vector diagram of the stator winding according to the first embodiment.

Winding section 37 and winding section 38 generate voltage in the same phase at the opposite ends. Therefore, the voltages in vector can be illustrated in a diamond shape, as shown in FIG. 5, which illustrates voltages in vector of the star connected X, Y and Z-phase windings. Thus, a three-phase winding can be formed of six different winding sections.

Figure 6:
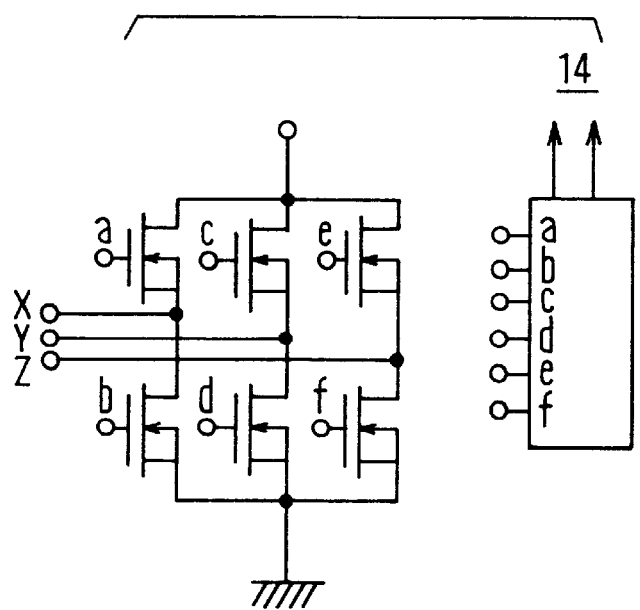
FIG. 6 is a circuit diagram of a control unit according to the first embodiment.

Three output terminals 33 (33a, 33b, 33c) of three-phase winding 32 are connected to control unit 4 via respective terminals 13 (13a, 13b, 13c). Control unit 4 is connected to a vehicle battery. Control unit 4 includes a three-phase bridge circuit comprised of MOS-FETS and a control circuit for controlling the gate voltage of the MOS-FETS and field current, as shown in FIG. 6. Control unit 4 operates rotary electric machine 1 as a three-phase AC generator or a three-phase synchronous motor according to the vehicle running conditions or electric load conditions. In other words, control unit 4 has a function to convert alternating current to direct current and a function to switch on or off current that is supplied to the armature winding.

Figure 7:
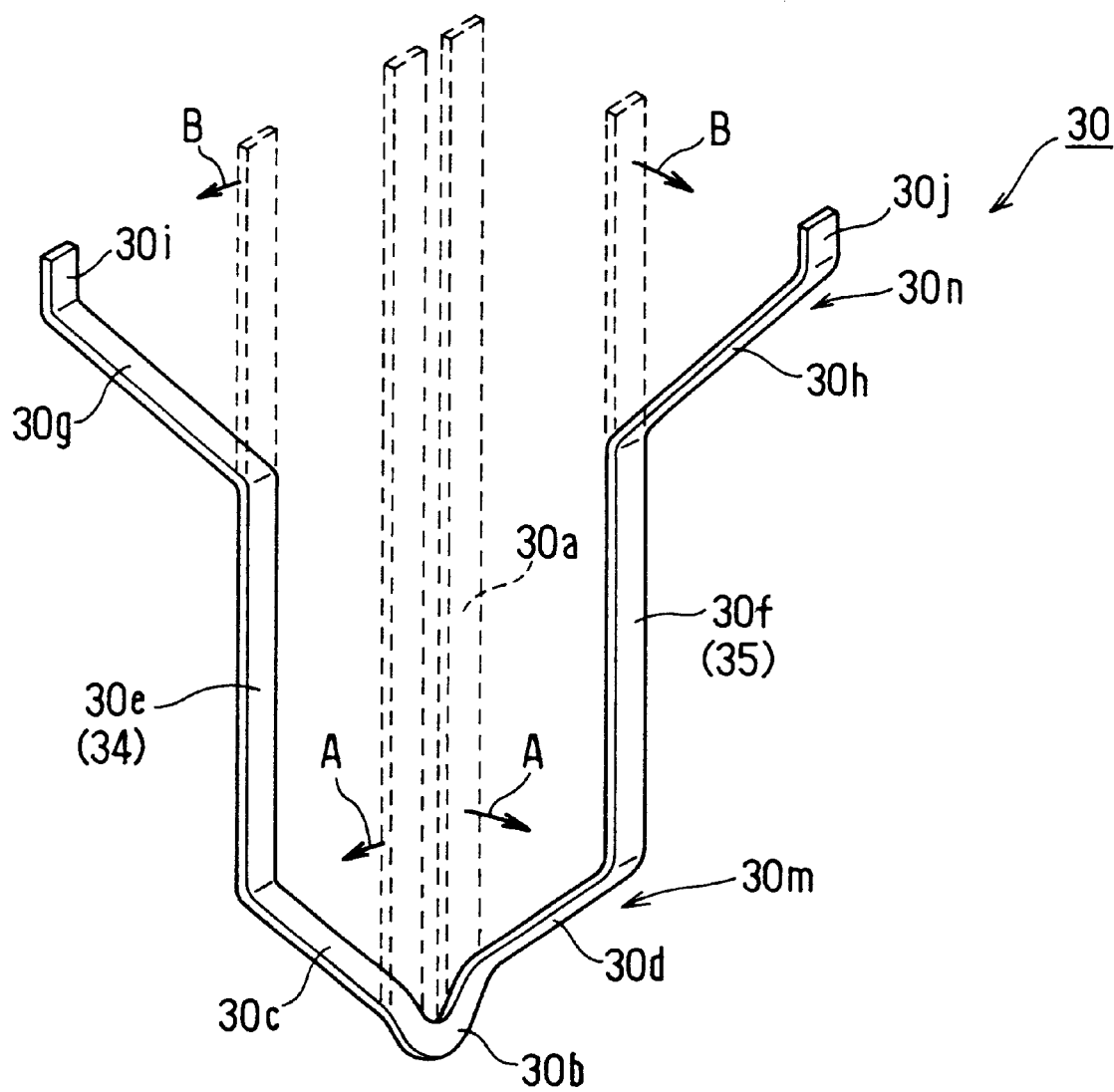
FIG. 7 is a perspective view of a conductor segment according to the first embodiment.
Figure 8:
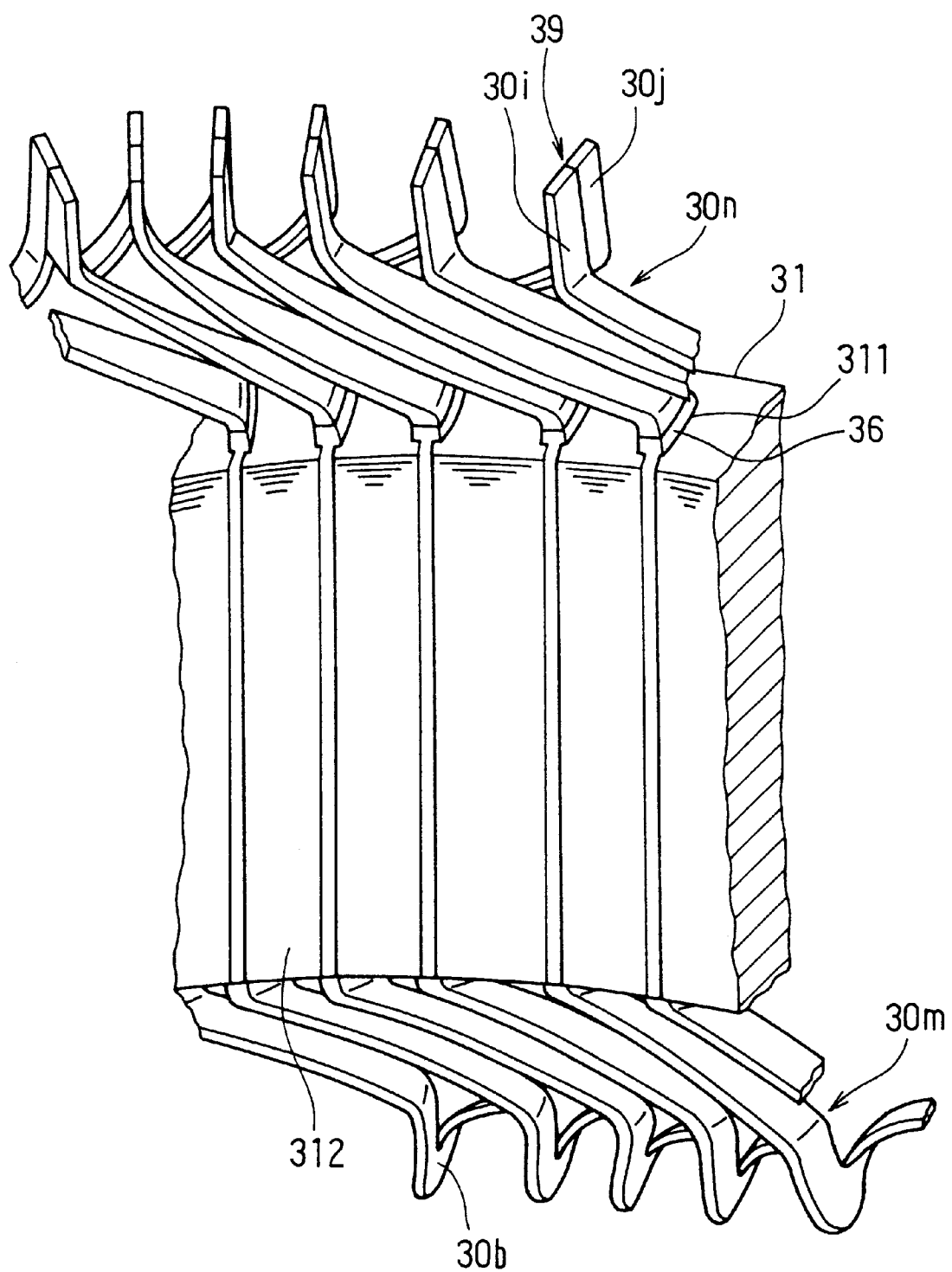
FIG. 8 is a perspective view of the stator according to the first embodiment viewed from the inside thereof.

Inner conductors 34 and outer conductors 35 are formed of conductor segments, and a plurality of conductor segments is connected in series to form a series-connected winding. As shown in FIGS. 7 and 8, most portion of the stator winding is comprised of U-shaped conductor segments 30, and the ends of the statorwinding 37d, 37e, 38d and 38e are comprised of I-shaped conductor segments. Crossing wires 37c and 38c are comprised of U-shaped conductor segments the span of which is one slot-pitch shorter than a pole pitch. All the conductor segments are made of film-coated copper wires as shown in FIG. 2.

In FIG. 7, conductor segment 30 is formed of a copper wire, which is bent to form hairpin-shaped segment 30a, thereafter, twisted at portions A near turn portion 30b, and twisted at portions B near the ends thereof. Portions A are twisted before the segments. are mounted in stator core 31, and portions B are twisted after the segments are mounted in stator core 31.

Turn portion 30b and inclined portions 30c and 30d of conductor segments 30 form a coil end 30m on an end of stator winding 32. Inclined portions 30g and 30h and segment ends 30i and 30j form another coil end 30n on the other end of stator winding 32. Segment ends 30i and 30j of one conductor segment 30 are respectively connected to the segment ends of other conductor segments by welding, forming joint portions 39. Straight portion 30e is disposed in one slot 311 as inner conductor 34, and straight portion 30f is disposed in another slot 311 as outer conductor 35. The one slot 311 and the another slot 311 are a predetermined number of pole-pitches spaced from each other.

As shown in FIG. 8, a plurality of coil ends 30m forms a ring-shaped coil-end group. Each of the plurality of coil ends 30m is spaced apart from another to form gaps, which cooling air is taken, in.

When the rotary electric machine operates as a generator, engine torque is transmitted to pulley 22, which rotates rotor 2. When field coil 25 is energized, magnetic core 24 is polarized to form sixteen magnetic poles. Consequently, magnetic flux is supplied to stator winding 32 of stator 3, and AC voltage is generated therein. The AC voltage is rectified by control unit 4, and DC output voltage is provided.

When the rotary electric machine operates as a motor, direct current is supplied from a battery to control unit 4, which provides a three-phase AC voltage through its switching operation. The three-phase AC voltage is applied to stator winding 32 to form a rotating magnetic field, which rotates rotor 2 as a magnetic rotor member.

The rotary electric machine has six phase-windings (wave-wound winding sections). However, a three-phase bridge circuit of the control unit, which is more compact and inexpensive, can be used.

Two conductors, which are accommodated in two layers in each slot, make comparatively small portions of coil ends thereof overlap each other. Therefore, the heat dissipation is improved. In addition, cooling air passes through between coil ends so that energy loss caused by heat can be reduced.

The rotary electric machine has a stator core in which winding sections are disposed 30° in electric angle different from each other. Therefore, magnetic pulsation can be moderated so that noises can be reduced.

Figure 9:
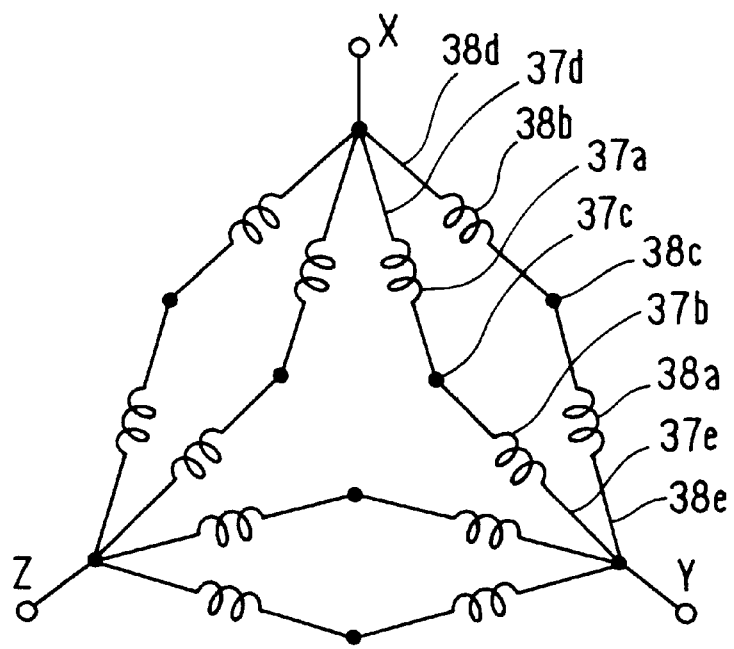
FIG. 9 is a vector diagram of a stator winding according to a second embodiment of the invention.

It is possible to use a multi-phase ring-connected stator winding according to a second embodiment of the invention, as shown in FIG. 9, instead of the star-connected stator winding shown in FIG. 5.

Furthermore, it is possible to add a structure of cooling the stator core and stator winding, thereby improving the efficiency.

Figure 10:
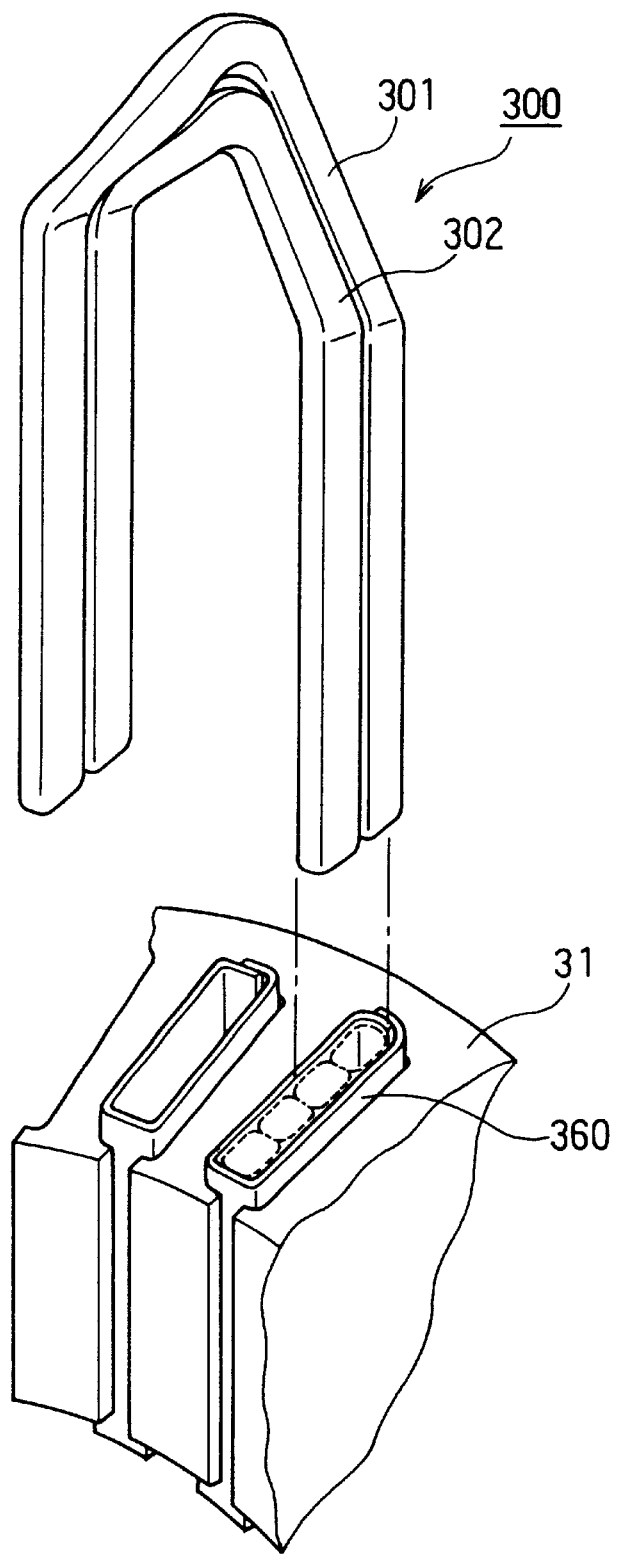
FIG. 10 is a perspective exploded view of conductor segments to be inserted into a stator core according to a third embodiment of the invention.

Instead of the conductor segments shown in FIG. 7, it is possible to use the conductor segments according to a third embodiment of the invention, as shown in FIG. 10. In this case, the number of conductors in each slot is four. The number of the conductors can be selected according to the driving torque and the output electric power. Conductor segments 300 are mainly formed of large segments 301 and small segments 302. Therefore, four conductors are lined up along a radial direction in each slot as illustrated by broken lines in FIG. 10. Here, one slot-group has two two-turn lap-wound winding units. It is also possible to form four wave-wound winding units. Thus, the same-phase winding sections can be formed of either wave-wound winding units or lap-wound winding units. A half of the conductor segments accommodated in one of neighboring two slot groups and a half of the conductor segments accommodated in the other group are connected in series to form a winding section. Thus, two winding sections are connected in parallel to each other to form a phase winding. Insulators 360 are preferably curled into columnar members as shown in FIG. 10.

It is also possible to provide a stator having four or more electric phases.

Figure 11:
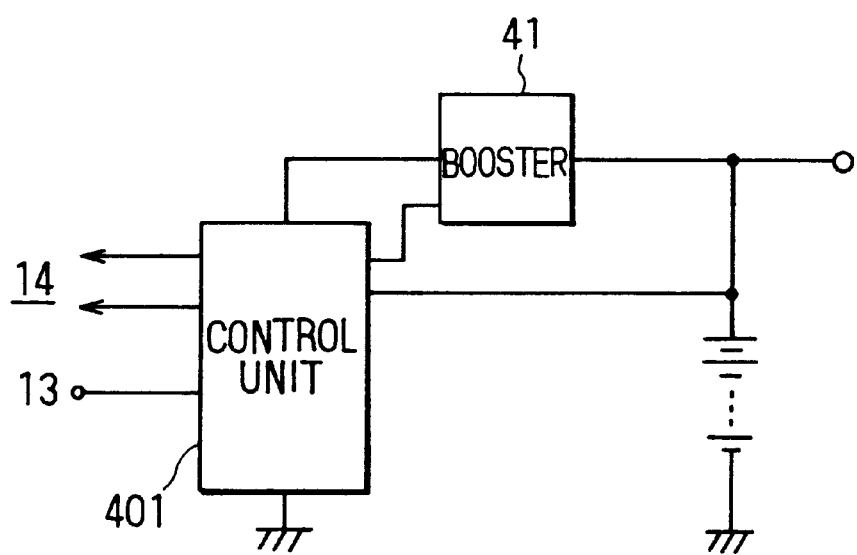
FIG. 11 is a circuit diagram of a battery charging system according to a fourth embodiment of the invention.
Figure 12:
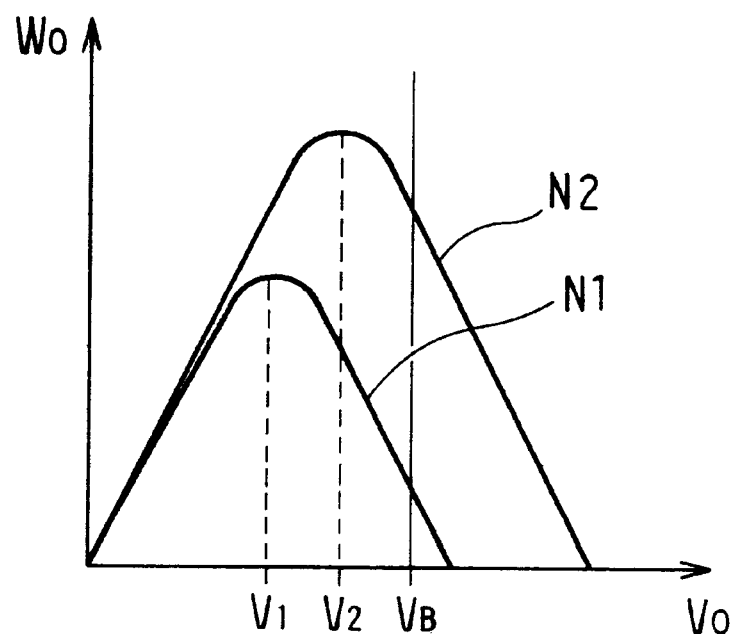
FIG. 12 is a graph showing a relationship between generator output voltage and generator output power with respect to the rotation speed of the generator according to the fourth embodiment.

A rotary electric machine according to a fourth embodiment has a battery charging system shown in FIG. 11. The battery charging system has booster 41 for boosting output voltage of control unit 401 up to a voltage higher than a battery voltage. Booster 41 is controlled by control unit 401. Control unit 401 controls the generator output voltage to provide a maximum electric power while the engine rotation speed is in a low speed range. When the generator output voltage is lower than a battery voltage, control unit 401 controls booster 41 to boost the output voltage thereof, thereby charging the battery. For example, when the rotary electric machine rotates at a low speed, such as speed N1 or N2 in FIG. 12, the output voltage is lowered to voltage V1 or V2 that is lower than the battery voltage VB. Subsequently, the voltage V1 or V2 is boosted to a voltage higher than the battery voltage VB. FIG. 12 shows generator output power in Y-axis and generator output voltage in X-axis when the engine speed is N1 and N2 (N1<N2). The above described structure is effective to supplement the generator output power in case the number of conductors in each slot is so small that the generator output power is not high enough in a low speed range. This structure is well fit for an idle-stop system that stops a vehicle engine temporarily when the engine runs at an idling speed.

Figure 13:
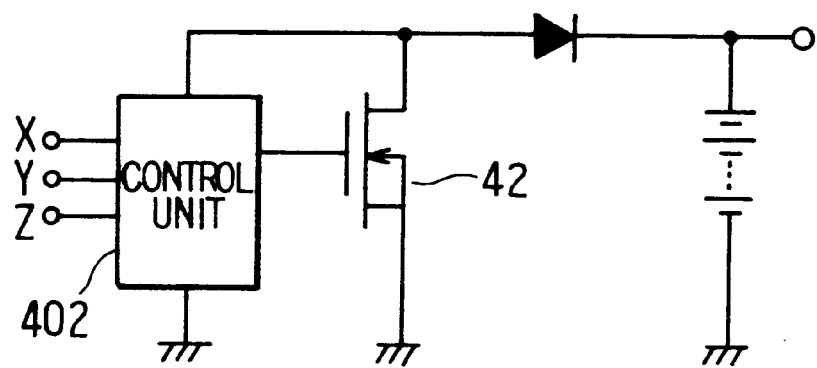
FIG. 13 is a circuit diagram of a battery charging system according to a fifth embodiment of the invention.

A battery charging system of a rotary electric machine according to a fifth embodiment of the invention is shown in FIG. 13. The battery charging system is equipped with switch element 42 for grounding the output voltage of control unit 402. This battery charging system controls switch element 42 to repeat the switching operation, thereby generating voltage Vo that is higher than battery voltage Vb so as to charge a battery. This also can supplement the generation power in a low speed range.

It is also possible to combine the systems shown in FIGS. 11 and 13. That is, induced voltage by repeated switching operation of grounding the output terminal is set to a voltage that corresponds to a maximum output power. Thus, the output power in a low speed range can be increased.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A vehicle rotary electric machine comprising:
   a rotor having a plurality of magnetic poles;
   a stator having a stator core opposed to said rotor and a multi-phase stator winding, said stator core having a plurality of slots accommodating a plurality of conductors connected to form said stator winding; and
   a frame for supporting said rotor and stator, wherein
      said multi-phase stator winding comprises a plurality of phase windings;
      each of said phase winding comprises a plurality of parallel-connected winding sections, and
      each winding section comprises a plurality of series-connected conductors distributed to a plurality of slots that is neighbor to each other.

2. The vehicle rotary electric machine as claimed in claim 1, wherein
   said plurality of winding sections is the same in phase with one another at opposite ends to be connected in parallel.

3. The vehicle rotary electric machine as claimed in claim 1, wherein
   said plurality of phase winding sections has a first winding section and a second winding section,
   said first winding section comprises a series circuit of a portion of a plurality of conductors disposed in one of said two neighboring slots and a portion of a plurality of conductors disposed in the other slot, and
   said second winding section comprises a series circuit of the remaining portion of said plurality of conductors disposed in said one slot and the remaining portion of said conductors disposed in said the other slot.

4. The vehicle rotary electric machine as claimed in claim 3, wherein
   said first winding section comprises a series circuit of a half of a plurality of conductors disposed in one of said two neighboring slots and a half of a plurality of conductors disposed in said the other slot.

5. The vehicle rotary electric machine as claimed in claim 1, wherein
   if the number of poles of said rotor is p, the number of phases of said multi-phase stator winding is n, the number of the neighboring slots for accommodating conductors of said phase winding of said stator winding is m, the total number of said slot is equal to or more than p×n×m.

6. The vehicle rotary electric machine as claimed in claim 1, further comprising:
   a plurality of switch elements connected to respective phase windings of said multi-phase stator winding.

7. The vehicle rotary electric machine as claimed in claim 1, wherein
   said plurality of conductors comprises a plurality of conductor segments connected at coil ends extended to an end of said stator core.

8. The vehicle rotary electric machine as claimed in claim 7, wherein
   said end of said stator core has a plurality of coil ends extended to spaced apart from one another.

9. The. vehicle rotary electric machine as claimed in claim 1, wherein said conductors disposed in said slots have a rectangular cross-section having longer radial sides.

10. The vehicle rotary electric machine as claimed in claim 1, further comprising a booster for boosting output voltage generated by said stator winding in a low speed range.

11. The vehicle rotary electric machine as claimed in claim 1, further comprising a switching device which repeats grounding and opening of the output terminal of said stator winding.

* * * * *